United States Patent
Harris, Sr.

(10) Patent No.: US 10,314,248 B2
(45) Date of Patent: Jun. 11, 2019

(54) BOTTOMLESS IN-GROUND GARDEN-PLANT WATERING-WELL WITH BORDER PAVER

(71) Applicant: Donald Eugene Harris, Sr., Cedar Park, TX (US)

(72) Inventor: Donald Eugene Harris, Sr., Cedar Park, TX (US)

( * ) Notice: Subject to any disclaimer, the term of this patent is extended or adjusted under 35 U.S.C. 154(b) by 0 days.

(21) Appl. No.: 15/068,550

(22) Filed: Mar. 12, 2016

(65) Prior Publication Data

US 2017/0181390 A1 Jun. 29, 2017

Related U.S. Application Data

(63) Continuation-in-part of application No. 14/866,845, filed on Sep. 26, 2015, now Pat. No. 10,123,490.

(51) Int. Cl.
| | |
|---|---|
| *A01G 13/04* | (2006.01) |
| *A01G 9/28* | (2018.01) |
| *A01G 13/02* | (2006.01) |
| *A01G 25/00* | (2006.01) |

(52) U.S. Cl.
CPC ........... *A01G 9/28* (2018.02); *A01G 13/0237* (2013.01); *A01G 25/00* (2013.01)

(58) Field of Classification Search
CPC ...... A01G 13/04; A01G 13/0237; A01G 9/02; A01G 9/021; A01G 9/10; A01G 9/102
USPC ........... 47/65, 65.5, 66.7, 69, 87, 19.1, 19.2; D11/143, 152, 153, 154, 164
See application file for complete search history.

(56) References Cited

U.S. PATENT DOCUMENTS

| | | | | |
|---|---|---|---|---|
| 3,389,499 | A * | 6/1968 | Haile | E04C 1/395 220/23.4 |
| 3,906,665 | A * | 9/1975 | Medlin | A01G 9/027 47/86 |
| 6,105,309 | A * | 8/2000 | Takayanagi | A01G 31/02 47/62 A |
| 2002/0005011 | A1 * | 1/2002 | Goldberg | A01G 9/028 47/65.5 |
| 2009/0025290 | A1 * | 1/2009 | Trabka | A01G 9/026 47/66.7 |
| 2015/0282443 | A1 * | 10/2015 | Marshall | A01G 27/00 47/79 |
| 2016/0014976 | A1 * | 1/2016 | Kallabat | A01G 9/102 47/65.5 |

* cited by examiner

*Primary Examiner* — William V Gilbert

(57) ABSTRACT

Bottomless in-ground plant containers with watering-wells that are open at both ends that are both functional and decorative. The above-ground portions, the watering-well bowls, of these present embodiments have faux decorative pavers that add support in keeping the watering-wells above ground-level. The bottom, below-ground portions, the well barrels, have two attached horizontal flanges permanently attached to their bases to help prevent upward and downward movement, as-well-as adding extra stability in keeping the watering-well bowls above ground-level. These nonorganic watering-well bowls replace the organic soil watering-wells; and these in-ground plant-containers with watering-wells are for conserving water and the localized containment of water contaminated by pesticides, herbicides, and fertilizers.

7 Claims, 7 Drawing Sheets

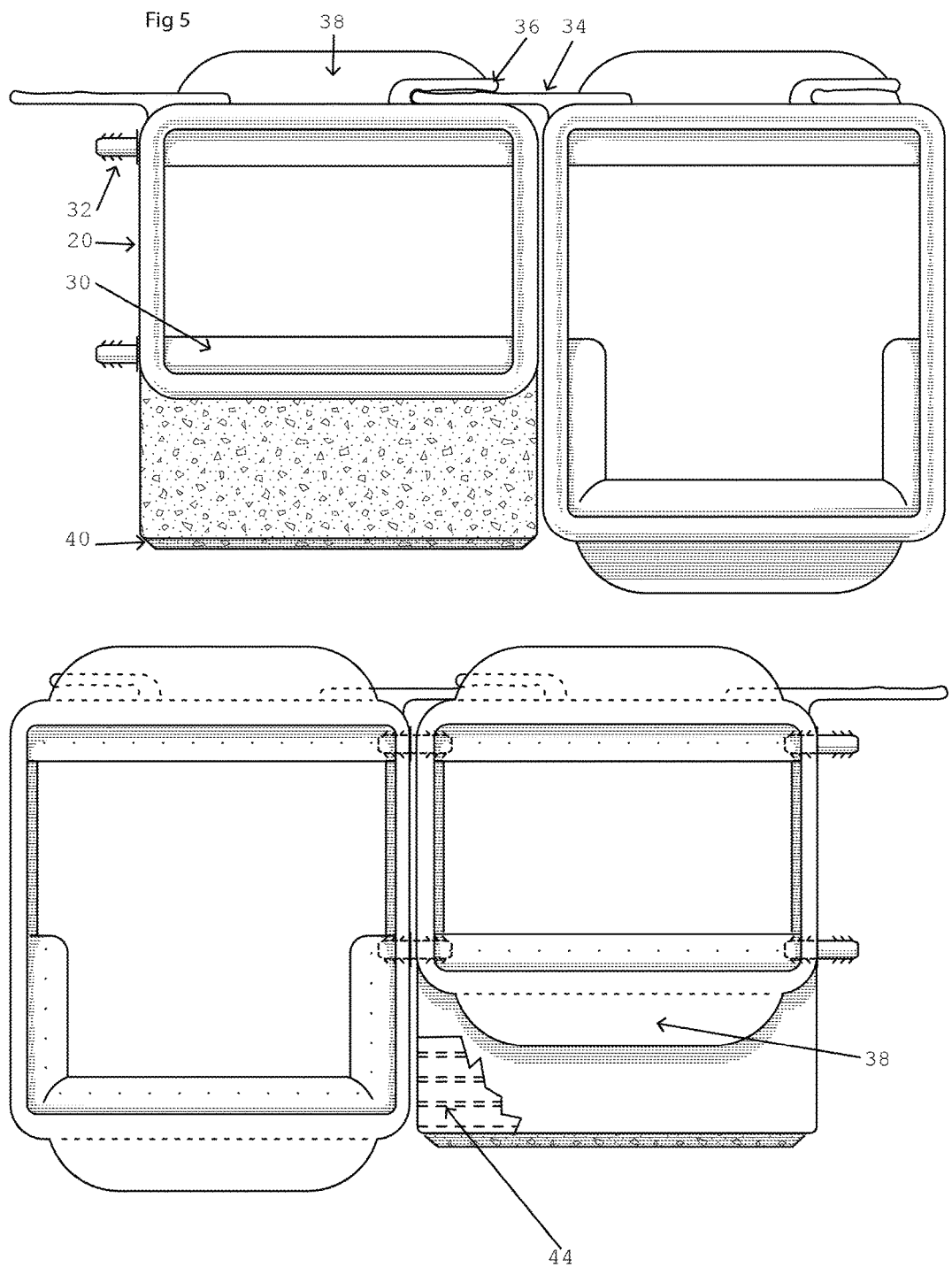

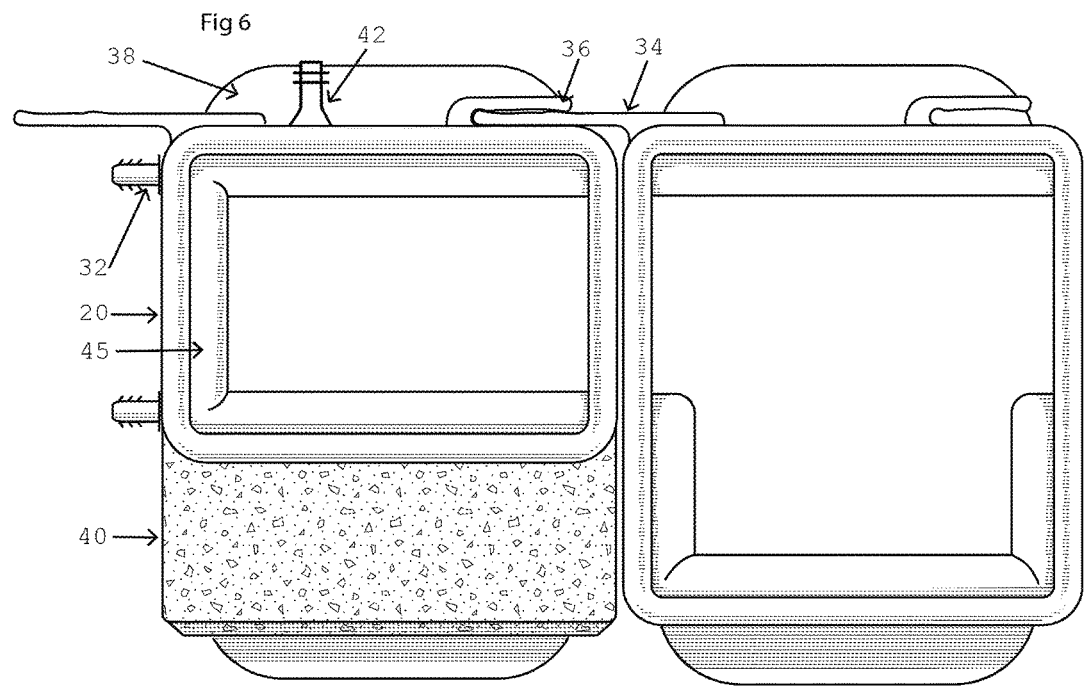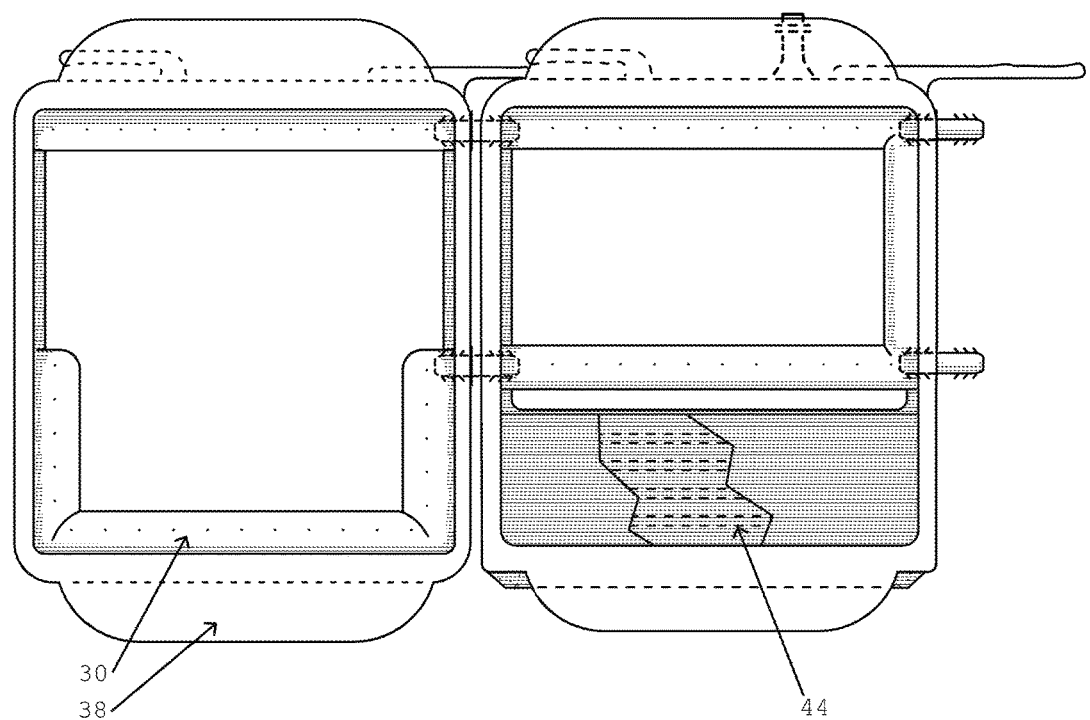

BOTTOMLESS IN-GROUND GARDEN-PLANT WATERING-WELL WITH BORDER PAVER

RELATED APPLICATIONS

Continuation-in-part; Application #: 23614068; Filed Sep. 26, 2015, for BOTTOMLESS IN-GROUND WATER CONSERVATION AND CONTAMINATION PREVENTION GARDEN-PLANT WATERING-WELL; by Donald E. Harris, Sr.

FIELD OF THE INVENTION

This present embodiment relates to bottomless garden plant containers and, more particularly, to a bottomless garden plant container that conserves water and limits unwanted water waste, including the limiting of pesticide, herbicide, and fertilizer contamination due to uncontrolled water runoff.

BACKGROUND

Plant and flower gardening has been around since the beginning of civilization and with it comes the continuous need for fertilizer, weed and pest prevention, and water, lots and lots of water. Water has always been a precious, and, an invaluable resource, and in today's world it is even more so, and the need for conserving it is at an all-time high.

Nearly every home, in nearly every place, has an area where they will have plants and flowers growing, or someone attempting to do so. According to the article, 'Blades of glory: America's love affair with lawns,' in the Jun. 24, 2011 edition of the magazine, *The Week*, about 80 percent of American homes have yards—and based on the 2011 *American Housing Survey of the United States*, there are approximately 100 million houses in America. This means there are approximately 80 million American yards, or variants of yards, that can be landscaped, and landscapes need watering.

The scope of this embodiment does not deal with watering lawns; its focus is primarily with the many flowering annuals, perennials, bulbs, small to larger shrubs, and all the varying things gardeners like to plant in the soil of all these yards aside from their lawns. This equates to lots of watering, fertilizing, herbicides, and the applying of pesticides; and herein lies the problem: lots of water, contaminated with fertilizers, herbicides, and pesticides can end up flowing away from the target plant and flowers towards areas for which they were not intended.

Every day there is someone, somewhere, watering a plant in their garden; and along with them are the gardening enthusiasts, who out of love for their little botanical friends, are diligently applying fertilizers, pesticides, and herbicides. One outcome that these well-meaning groups have in common is this: more-often-than-not they watch helplessly as much of the needed water, and gardening additives, flow to surrounding areas and away from the plant for which they were intended; and in today's world water has become a commodity, and its conservation is a responsibility in which each person should participate.

There have been attempts at correcting this seemingly universal problem for gardeners for many years and a prevalent solution was to build up a bowl shaped mound of soil around the base of the plant, commonly referred to as a soil watering-well. It was intended to contain the water long enough for it to percolate down to the plant's roots. A few of the other solutions are the use of mulches piled around the plant in the hopes of retaining moisture; or stones sunk into the soil around the plant as a border, or to simply place the plant several inches below ground level.

Unfortunately, the aforementioned so-called solutions, along with many others, generally fail soon after their implementation. A soil watering-well tends to absorb water laterally as well as gravitationally, and by the very act of watering it erodes away. And when the soil watering-well erodes away the dry soil has less time for the water to saturate down before the water becomes wasteful runoff. And often, taking with it, gardening chemicals such as fertilizers, pesticides, and herbicides.

Mulch mounds are not much better at solving the issue in fact, they can exacerbate the problem of garden chemical products like pesticides and herbicide runoff. Mulches are breeding grounds for pests like earwigs and pillbugs to name a few, which encourages greater use of pesticides, which then accumulates in the mulches; and mulches tend to float and flow with water runoff from over watering and large downpours of rain. These so-called solution failures are typical of the other solutions as well as those not mentioned. The worst consequence of these runoffs are the gardening chemicals used to help grow and protect our garden plants often end up flowing into street gutters, streams, ponds and other environmentally sensitive areas. Although there are various methods of trying to prevent water and chemical runoff, all, or almost all suffer from one, or more than one disadvantage.

Therefore, there is a need to provide methods and apparatus for improved, and more secure methods, for the controlling of wasteful water runoff and the containment of useful gardening products to limit them from becoming a detriment, and danger, to their surrounding environments.

As long as there are plants and water, there will be gardening, and gardening is here stay, and it can be accomplished more effectively and environmentally friendly.

PRIOR ART

The following is a tabulation of some prior art that presently appears relevant:

I am aware of U.S. Pat. No. US 2009/0025290 A1, Jan. 29, 2009, Bottomless Plant Container which was issued to Ball Horticultural Company for growing plants in an open-bottom plant container.

I am, also aware of prior art U.S. Pat. No.: US 2002/0005011 A1 issued to Lauri and David Goldberg Jan. 17, 2002 Bottomless Compartmentalized In-Ground Garden Container.

Shortcomings of Other Solutions

U.S. Pat. No. U.S. 2009/0025290 A1 Open-bottom plant container is a temporary biodegradable container for transporting rooted plants for placing in their final growing site.

These products are designed as only temporary containers; whereas this present embodiment of the Bottomless In-Ground Garden-Plant Watering-Well with Border Paver is for permanent use.

Also, it is neither taught nor suggested that U.S. Pat. No. US 2009/0025290 A1 Bottomless Plant Container is designed to conserve water and limit the runoff of gardening chemicals or products.

U.S. Pat. No.: US 2002/0005011 A1: What is disclosed is a garden container that includes a rigid outer wall defining a perimeter and having opposite upper and lower edges around the perimeter. Its outer and inner circular walls and intersecting walls are so designed to slice into the soil.

It is neither taught nor suggested that this bottomless container is designed to conserve water and limit the runoff of gardening chemicals or products. It also states, that: " . . . substantially the container may be manually placed or depressed into the soil until the rim of the container is generally flush with the soil surface." (Excerpt from Summary of the Invention; first paragraph, lines: 11-13).

Unfortunately, being flush with the soil allows for wasteful water runoff, chemical contamination of surrounding areas and the dispersion of other gardening products. This prior art bottomless garden container has no apparatus to limit vertical movement either upwards or downwards, which could result in all, or portions, of this prior art container sinking below ground level; and it is neither taught nor suggested that this device was designed to prevent that from happening.

Advantages of the Present Embodiment

Thus several advantages of one or more aspects would be to provide a bottomless in-ground plant container that conserves water via the use of a non-eroding watering-well.

Other advantages of one or more aspects are to provide a bottomless in-ground plant container watering-well that helps protects its surrounding environments from harmful herbicides, pesticides, and fertilizer runoff.

It would also be advantageous to have a bottomless in-ground plant container watering-well that protects plants and flowers from grass trimmers above ground and help prevent unwanted weeds and grass rhizomes below ground.

It would also be advantageous to have a bottomless in-ground plant container that can keep bulbs and rhizomes in one location and separate from others to help prevent unwanted color change.

It would further be advantages to have a bottomless in-ground plant container watering-well that encourages earthworm growth and population for plant and soil health.

It would also be advantages to have a bottomless in-ground plant container watering-well that directs water flow downwards to the plant's roots instead of flowing away from the roots and across the soil's surface.

These and other advantages of one or more aspects will become apparent from a consideration of the ensuing description and accompanying drawings.

SUMMARY OF THE INVENTION

In accordance with the present embodiment of the Bottomless In-Ground Garden-Plant Watering-Well with Border Paver, there is provided an in-ground plant container that is open at both ends and is both functional and decorative. This embodiment consists of a plant container that has an above ground-level portion and a below-ground-level portion. The above ground-level portion is the watering-well's bowl, and the below-ground-level portion is the watering-well's barrel. This plant container has on its front-side a faux paver that can be either over-set, where it can sit on top of a real paver, concrete sidewalk, or simply edge a garden path; or flush-set, where it can butt against a real paver; concrete sidewalk, or simply edge a garden path. On the back-side of the plant-container are two grass-guards, both a male and female and when connected to another watering-well border paver plant-container a shield is created to help prevent unwanted grass from growing between the plant containers. Attached to the outside bottom of the front and back side walls of the well-barrel of the plant container is a flange to prevent both vertical and downward movement and to ensure the watering-well stays above ground-level.

BRIEF DESCRIPTION OF THE DRAWINGS

A complete understanding of the present invention can be obtained by reference to the accompanying drawings when considered in conjunction with the subsequent, detailed description, in which:

FIG. 5 shows top and bottom views of a single over-set border paver watering-well with the drip irrigation system and its optional paver-less spacer watering-well with the drip irrigation system.

FIG. 6 shows top and bottom views of a single flush-set border paver watering-well with the drip irrigation system and its optional paver-less spacer watering well with the drip irrigation system.

Figure 1:
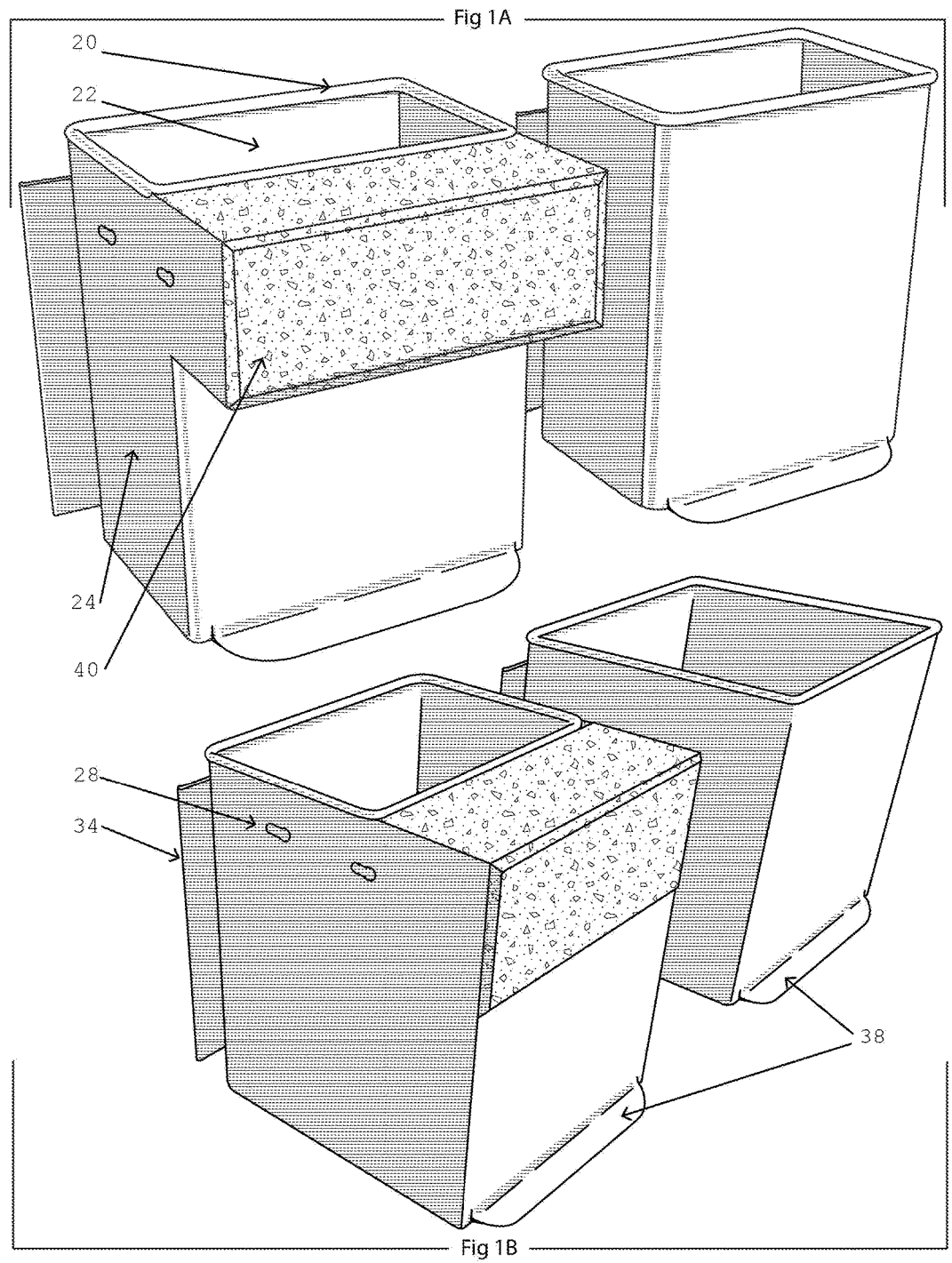
FIGS. 1A to 1B show two options for a watering-well with border paver. 1A is a front perspective view of a single non-drip over-set border paver watering-well with a paver-less spacer; 1B is a front perspective view of a single non-drip flush-set border paver watering-well with a paver-less spacer.

7A shows an embodiment using a corner-angle watering-well border pave attached to a four-group watering-well border paver with attached decorative fencing.

7B shows an embodiment of watering-wells with border pavers with a curved organic design.

7C shows top views of a right-angled border paver watering-well and a four-grouped watering-well embodiment.

For purposes of clarity and brevity, like elements and components will bear the same designations and numbering throughout the Figures.

DRAWINGS—REFERENCE NUMERALS 20 lip 22 bowl
24 barrel 26 keyed paver end-cap
27 drip plug 28 key slot
30 irrigation drip-tube 32 irrigation coupling
34 male grass-guard 36 female grass-guard
38 perpendicular flange 40 faux paver
42 male quick-connect valve 44 paver support ribs
45 crossover drip tube

DETAILED DESCRIPTION OF THE PRESENT EMBODIMENT

Before this present embodiment of a Bottomless In-Ground Garden-Plant Watering-Well with Border Paver, along with its methods are disclosed and described, it is to be understood that this present embodiment is not limited to the particular configurations, sizes, or materials disclosed herein as such configurations, sizes, and materials may vary somewhat. Nor are any concept illustrations or diagrams to be construed as limiting. It is also to be understood that the terminology employed is used to describe this particular embodiment and is not intended to be limiting. However, for brevity's sake throughout the description, the Bottomless In-Ground Garden-Plant Watering-Well with Border Paver may be referenced simply as border paver watering-well; and furthermore, border paver watering-wells can be either flush-set or over-set, drip irrigated or non-drip irrigated.

FIG. 1A is a front perspective view of a single non-drip over-set border paver watering-well with its paver-less spacer watering-well in accordance with the present embodiment. This present embodiment has, for example, an environmentally friendly polypropylene plastic as its construction material and its construction will be apparent to those skilled in the art of plastic fabrication. In this embodiment the border paver watering-well is of a single rectangular design; however, in alternate embodiments, it can be in units of two or more border paver watering-wells combined to create a single unified whole. And border paver watering-wells could be shaped as a square or any other geometrical shape or any organic shape or configuration deemed aesthetically pleasing or advantageous.

Border paver watering-wells have an above ground-level portion that makes up a bowl 22 and a below-ground-level portion that makes up a barrel 24. Running along the top edge of the bowl 22 is a lip 20 for limiting cuts and abrasions to plant stems and stalks. Protruding from the front of the bowl 22 is a faux paver 40 that is enclosed to keep pests such as snails, earwigs, crickets, mice, and rats to name a few, from hiding out-of-site, nesting, or causing damage. The faux paver 40 is both functional and decorative; and this faux paver 40, along with the perpendicular flanges 38, contribute to keeping the bowl 22 above ground level to prevent wasteful water runoff and the unwanted spread of gardening chemicals. Within the faux paver, 40 are paver support ribs 44 for added strength. Attached to the back outside walls of both the bowl 22 and the barrel 24 are a male grass-guard 34 and a female 36 grass-guard. These grass-guards have a two-fold purpose: 1) they help limit unwanted grass from growing between two or more joined border paver watering-wells; and 2) the grass-guards interlock to join multiple border paver watering-wells together. At the base of the barrel, 24 on the front and back outside walls are perpendicular flanges 38 to help limit upward and downward movement of the border paver watering-well. On both side walls of the border paver watering-well are key slots 28 for attaching an optional keyed paver end-cap 26 for an added decorative finish for non-drip irrigation border paver watering-wells.

FIG. 1B is a front perspective view of a non-drip irrigation flush-set border paver watering-well, and its paver-less spacer watering-well for use in areas where an over-set border paver watering-well is not needed or practical, and its construction is the same as FIG. 1A, the only difference is its design.

Figure 2:
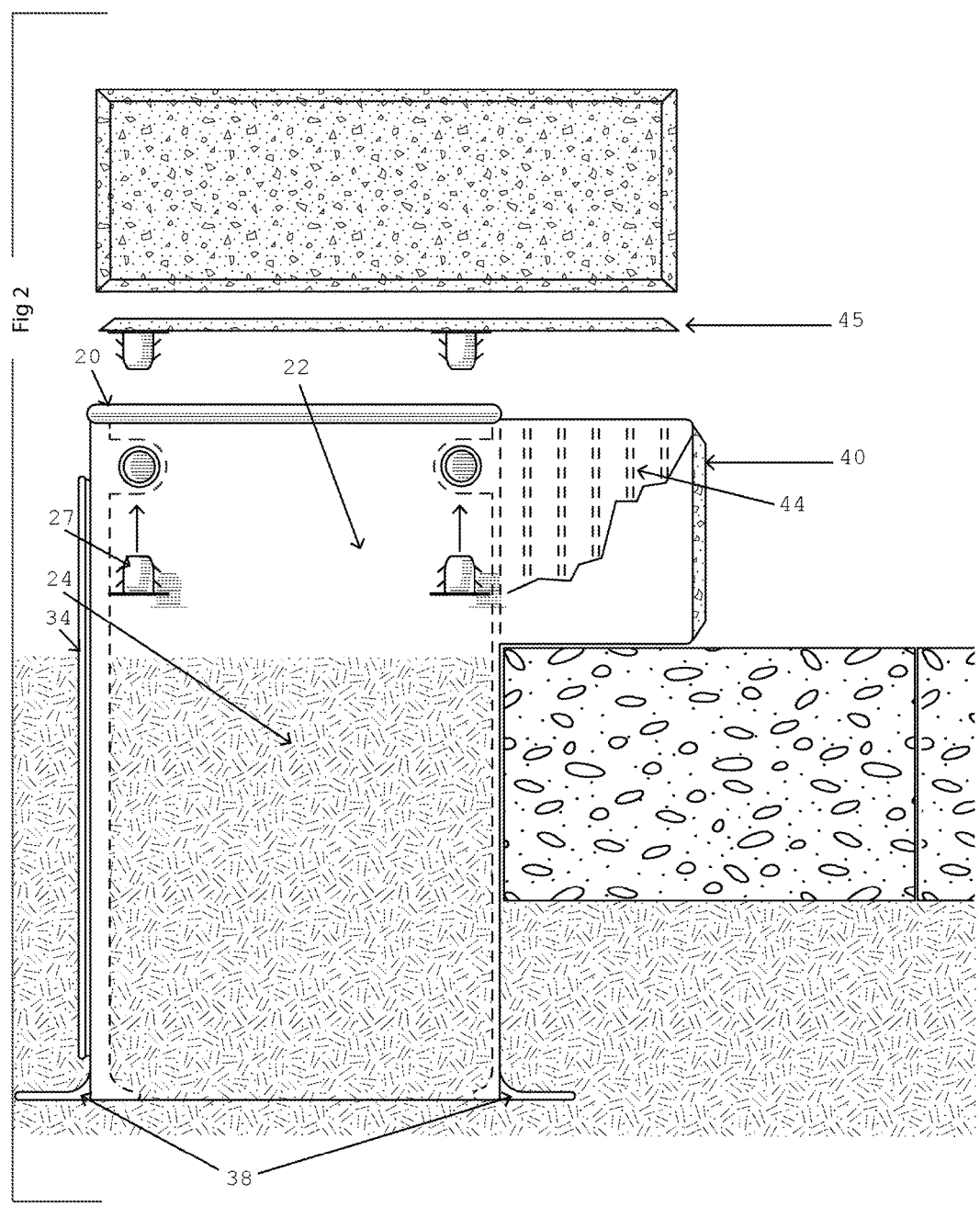
FIG. 2 shows a side detail view of an optional end-cap paver with plugs for use on over-set border paver watering-wells that have the drip irrigation system, and a cutaway view of the over-set border paver resting on a concrete pathway.

FIG. 2 shows a side detail view of an optional plugged paver end-cap 26 for use on a single over-set border paver watering-well, that has a drip irrigation system, as an optional decorative finish. The cutaway view of the over-set border paver placed in the soil shows an ideal soil depth in relationship to its bowl 22 and its barrel 24, also shown are the paver support ribs 44 within the enclosed over-set faux paver 40 for added strength. The back walls of border paver watering-wells are thicker than the front to support the male 34 and female 36 grass-guards. Also shown are optional drip plugs 27 for border paver watering-wells that incorporate the drip irrigation system when the optional plugged paver end-cap 26 is not used.

Figure 3:
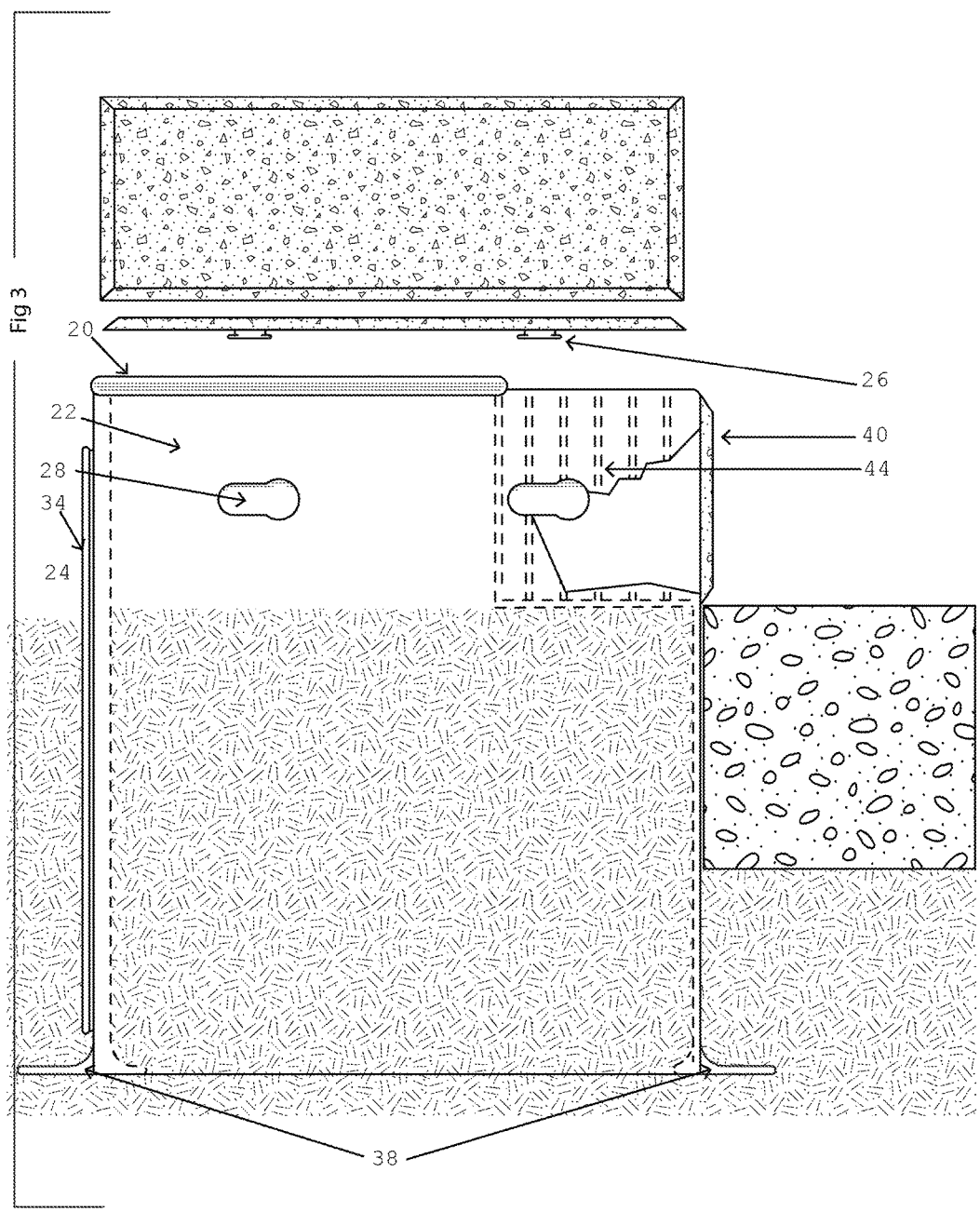
FIG. 3 shows a side detail view of an optional end-cap paver with keys for use on a flush-set border paver watering-well with key slots and no drip irrigation system and a cutaway view of a flush-set border paver butted up against a concrete pathway.

FIG. 3 shows a side detail view of an optional keyed paver end-cap 26 for use on a flush-set border paver watering-well that does not incorporate the drip irrigation system. On both side walls are key slots 28 for attaching the keyed paver end-cap 26. The cutaway view of the flush-set border paver watering-well placed in the soil shows an ideal soil depth in relationship to the bowl 22 and the barrel 24, also shown are paver support ribs 44 within the flush-set faux paver 40 for added strength.

Figure 4:
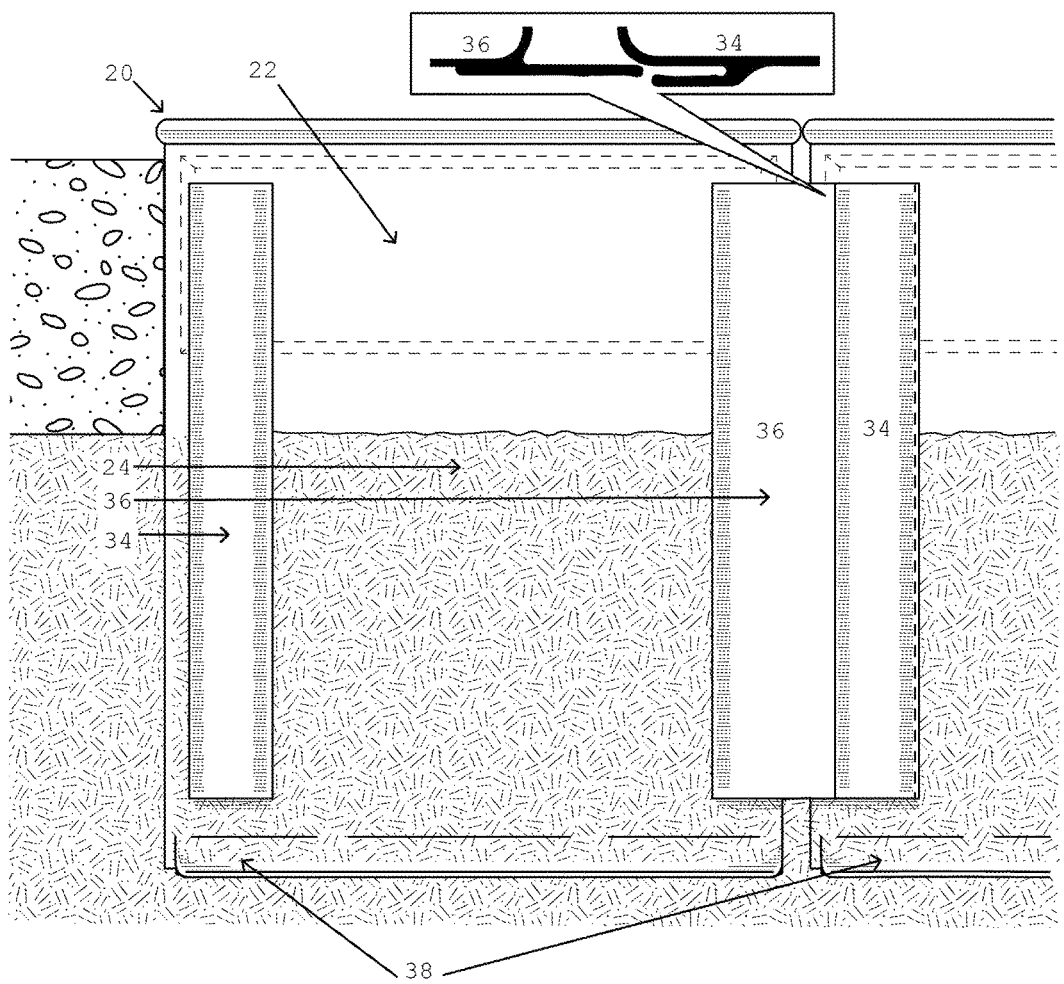
FIG. 4 is a rear detail view of a border paver watering-well placed in the soil and connected to a second border paver watering-well using male and female grass-guards.

FIG. 4 is a rear detail view of a border paver watering-well placed in the soil and connected to a second border paver watering-well by joining the male grass-guard 34 and the female grass-guard 36. Grass guards nearly run the complete vertical length of border paver watering-wells to ensure a strong interlocked attachment to an adjacent border paver watering-well, as well as to provide added limiting of unwanted grasses growing between them.

FIG. 5 shows top and bottom views of a single over-set border paver watering-well with its optional paver-less spacer watering-well along with its drip irrigation system showing its exposed removable irrigation couplings 32 with fixed gaskets. An irrigation coupling's fixed gasket keeps the coupling 32 from being accidentally inserted too far into the irrigation drip-tube 30 when two or more border paver watering-wells are joined together with the male 34 and female 36 grass-guards.

FIG. 6 shows top and bottom views of a single flush-set border paver watering-well with the drip irrigation system and its optional paver-less spacer watering-well. This border paver watering-well has a male quick-connect valve 42 for attaching a drip-line or watering hose with a matching female quick-connector. This border paver watering-well also has a crossover drip-tube 45, found on all border paver watering-wells with the quick-connect valve 42, thus creating a dual-sided drip irrigation system allowing for unbroken water flow whether using one, or more, border paver watering-wells.

Figure 7A:
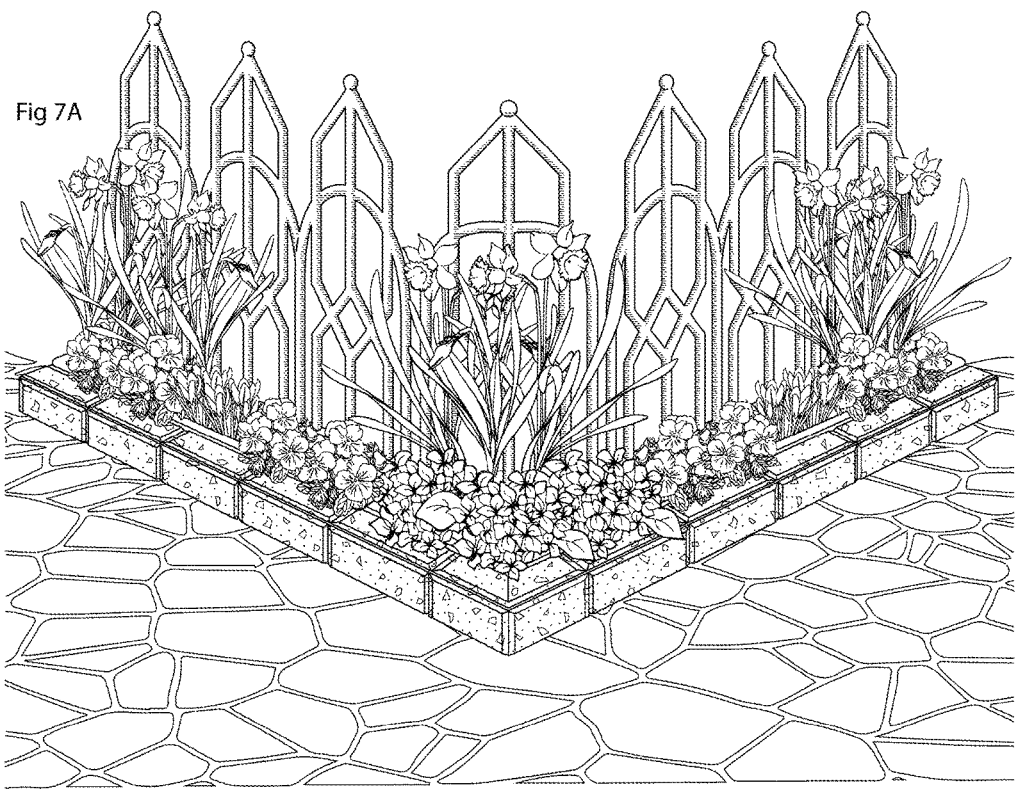
FIG. 7A to 7C shows a collective view of various aspects of In-Ground Garden-Plant Watering-Wells with Border Pavers. These conceptual aspects are not to be considered limiting, as watering-wells with border pavers can be configured in numerous ways, nor do they constitute a departure from the true spirit and scope of this present embodiment.
Figure 7B:
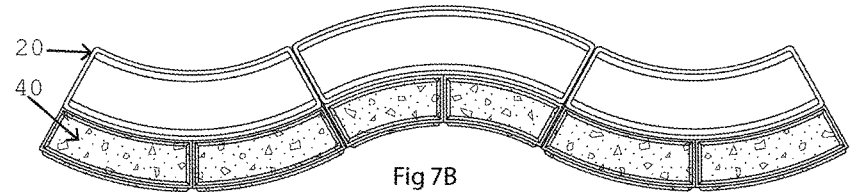
Figure 7C:
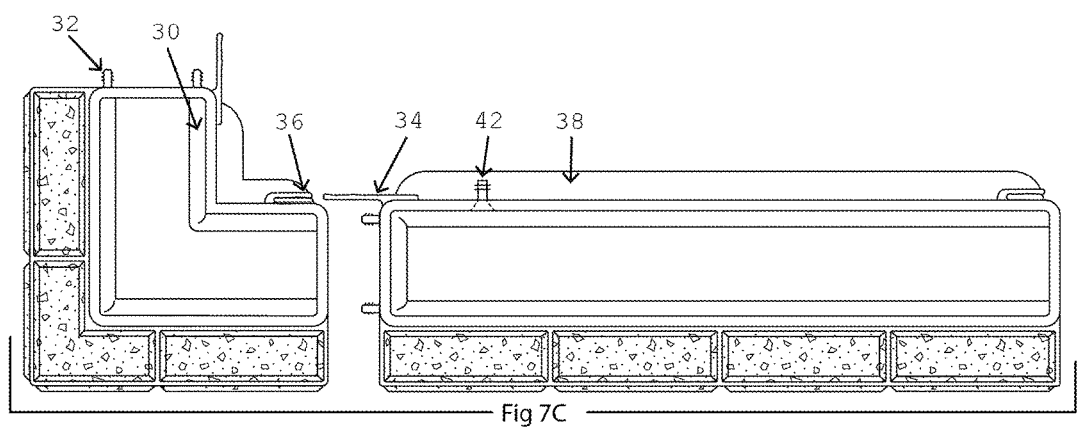

FIG. 7A to 7C is a collective view of various aspects of the In-Ground Garden-Plant Watering-Wells with Borders Pavers These conceptual aspects are not to be considered limiting, as watering-wells with border pavers can be configured in numerous ways, nor do they constitute a departure from the true spirit and scope of this invention.

7A shows an embodiment using a corner-angle watering-well border paver attached to a four-group watering-well border paver with attached decorative fencing.

7B shows an embodiment of watering-wells with border pavers with a curved organic design.

7C shows a top views of a right-angled border paver watering-well and a four-grouped watering-well embodiment.

Since other modifications and changes varied to fit particular operating requirements and environments will be apparent to those skilled in the art, this present embodiment is not to be considered limited to the examples chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A bottomless in-ground garden-plant watering-well comprising:
a watering-well bowl having a first side, a second side opposite said first side, a third side and a fourth side opposite said third side, said third side and said fourth side extending respectively from said first side to said second side to define an open upper end and an open lower end, said upper open end being defined by a first perimeter having a rounded lip, means for attaching a faux paver to at least one of said third side and said fourth side, said first side and said second side each having an interior surface and an exterior surface, said exterior surfaces each having a flange proximate said open lower end, each of said flanges extending substantially perpendicular to respective said surface from which each said flange extends; said exterior surface of said second side having a first edge and a second edge opposite said first edge, said exterior surface of said second side having a male coupling member proximate said first edge and a female coupling member proximate said second edge, said female member configured to receive a male member from a second watering-well bowl that is substantially identical to said first watering-well bowl.

2. The bottomless in-ground garden-plant watering-well in accordance with claim 1, wherein said garden-plant watering-well is configured to operate as an operable temporary well for water and liquids.

3. The bottomless in-ground garden-plant watering-well in accordance with claim 1, wherein said faux paver comprises paver support ribs encased within said faux paver.

4. The bottomless in-ground garden-plant watering-well with border paver in accordance with claim 1, wherein said exterior surface of said first side comprises a lower portion proximate said open lower end and an upper portion proximate said open upper end, said upper portion being further from said second side than said lower portion.

5. The bottomless in-ground garden-plant watering-well in accordance with claim 1, wherein said exterior surface of said first side is substantially planar.

6. A bottomless in-ground garden-plant watering-well system, comprising:
a watering-well bowl having a first side, a second side opposite said first side, a third side and a fourth side opposite said third side, said third side and said fourth side respectively extending from said first side to said second side to define an open upper end and an open lower end, said upper open end being defined by a first perimeter having a rounded lip, means for attaching a faux paver to at least one of said third side and said fourth side, said first side and said second side each having an interior surface and an exterior surface, said exterior surfaces each having a flange proximate said open lower end, each of said flanges extending substantially perpendicular to respective said surface from which each said flange extends; said exterior surface of said second side having a first edge and a second edge opposite said first edge, said exterior surface of said second side having a male coupling member proximate said first edge and a female coupling member proximate said second edge, said female member configured to receive and receiving a male member from a second watering-well bowl that is substantially identical to said first watering-well bowl; said first side of said first watering-well being substantially planar, and said exterior surface of said first side of said second watering-well comprises a lower portion proximate said open lower end and an upper portion proximate said open upper end, said upper portion being further from said second side than said lower portion.

7. A bottomless in-ground garden-plant watering-well comprising:
a watering-well bowl having a first side, a second side opposite said first side, and third side and a fourth side opposite said third side, said third side and said fourth side extending respectively from said first side to said second side to define an open upper end and an open lower end, said upper open end being defined by a first perimeter having a rounded lip, said first side and said second side each having an interior surface and an exterior surface, said exterior surfaces each having a flange proximate said open lower end, each of said flanges extending substantially perpendicular to respective said surface from which each said flange extends; said exterior surface of said second side having a first edge and a second edge opposite said first edge, said exterior surface of said second side having a male coupling member proximate said first edge and a female coupling member proximate said second edge, said female member configured to receive a male member from a second watering-well bowl that is substantially identical to said first watering-well bowl.

* * * * *